March 1, 1927.

I. RECKARD 1,619,314

SNOWPLOW

Filed Sept. 14, 1925

Witness
Ray Baker

Inventor
Irven Reckard
by Bair & Freeman Attorneys

Patented Mar. 1, 1927.

1,619,314

UNITED STATES PATENT OFFICE.

IRVEN RECKARD, OF DUNCOMBE, IOWA.

SNOWPLOW.

Application filed September 14, 1925. Serial No. 56,136.

The object of my invention is to provide a snow plow of simple, durable and inexpensive construction.

More particularly, it is my purpose to provide a simply constructed snow plow peculiarly adapted for use in clearing a path on paved highways and the like.

With these and other objects in view, my invention consists in the construction, arrangement and combination of the various parts of my snow plow, whereby the objects contemplated are attained, as hereinafter more fully set forth, pointed out in my claim, and illustrated in the accompanying drawings, in which:

Figure 1:
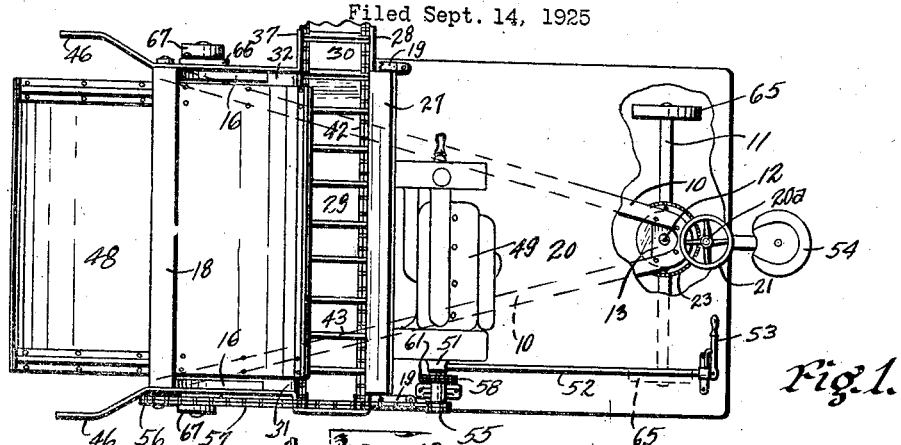
Figure 1 is a top or plan view of a snow plow embodying my invention, parts being broken away.

My improved snow plow is provided with a V-shaped frame having the arms indicated in the accompanying drawings by the reference numeral 10 connected at their rear ends and diverging toward the front end of the device.

Figure 2:
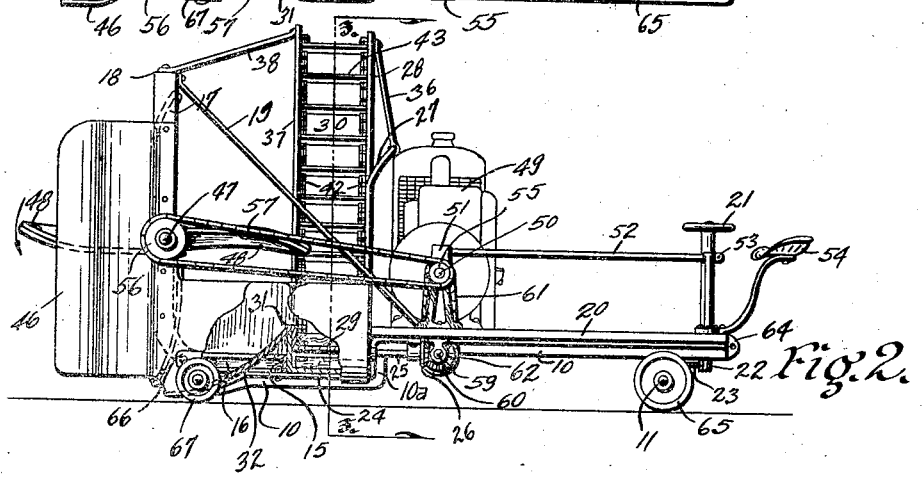
Figure 2 is a side elevation of the same, parts being broken away and parts being shown in section.

The arms 10 are provided toward their front ends with down-stepping portions 10ª as shown in Figure 2.

At the rear part of the machine, a cross axle 11 is pivotally mounted as by the upright shaft 12 journaled in a block 13 supported by the frame members 10.

Near their front ends, the frame members 10 are connected by a cross frame member 15, which is bent and extended forwardly at its ends as at 16, thence upwardly as at 17.

The upper ends of the portions 17 are connected by a cross member 18.

The portions 17 are connected by braces 19 with the platform 20, resting on the rear portions of the frame members 10.

For swinging the axle 11 for steering the device, I have mounted in the platform 20 an upright shaft 20ª in the upper end of which is a hand wheel 21 and on the lower end of which is a pinion 22 meshing with a gear 23 on the shaft 12.

Supported on the frame members 10 just forwardly of the portions 10ª thereof is a trough 24.

Spaced above the trough, I provide an endless conveyor, which will now be described.

Figure 3:
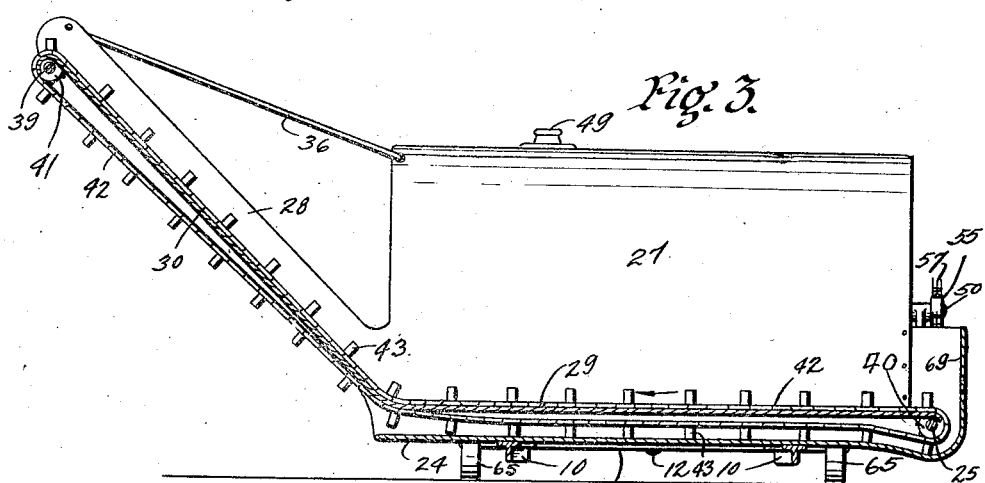
Figure 3 is a detail, sectional view taken on the line 3—3 of Figure 2.

At one side of the machine is mounted a longitudinally arranged shaft 25, as shown in Figure 3, which is suitably mounted on brackets or the like 26 on one of the frame members 10.

The rear wall of the trough 24 extends upwardly a substantial distance as at 27 and at one end has a portion 28 extending upwardly and laterally and forming the side of the discharge portion of the conveyor.

Spaced above the bottom of the trough 24 is mounted a second bottom 29, having at one side of the machine a portion 30 extending upwardly and laterally and forming a bottom of the discharge portion of the conveyor.

The bottom 29 has a portion 31 extended over the front wall of the trough 24 and then inclined forwardly and downwardly as at 32 to form a scoop for snow.

A brace 36 extends from the upper portion of the part 27 to the upper end of the wall 28, as shown in Figures 2 and 3.

The discharge portion of the trough has a side wall 37 connected by a brace 38 (Figure 2) with one of the upright portions 17 as shown in Figure 2.

Mounted at the upper end of the discharge portion of the conveyor is a shaft 39. On the shaft 25 are sprockets 40 and on the shaft 39 are sprockets 41. Chains 42 travel on the sprockets 40 and 41 and are connected by cross bars 43, which serve as conveyor bars or scrapers and thus form a substantial part of the conveyor.

The upper stretches of the chain 42 travel above a bottom member 29, which stands above the bottom 24 and has at one end an upwardly and laterally inclined portion 30 forming the bottom of the conveyor having the side walls 28 and 37 for its discharge portion.

Side wings 46 extend laterally and thence forwardly from the upright portions 17.

Mounted on the upright portions 17 is a transverse shaft 47 on which is mounted a beater having the wings 48.

On the platform 20 is a motor 49. A shaft 50 is mounted in line with the motor shaft and is designed to be adjustably connected therewith by means of a clutch structure 51 controlled by a rod 52 extending rearwardly and having a handle 53 accessible from the seat 54 mounted on the rear portion of the platform 20.

On the shaft 50 is a sprocket 55 aligned with a sprocket 56 on the fan or beater shaft 47. A chain 57 travels on the sprockets 55 and 56.

On the shaft 50 is a sprocket 58 (see Figure 1) in line with a sprocket 59 (see Figure 2) on a counter shaft 60.

A chain 61 travels on the sprockets 58 and 59.

The shaft 25 extends rearwardly in the machine to a point adjacent to the shaft 60. On the shaft 60 is a beveled gear 62 in mesh with a beveled gear on the shaft 25.

In the practical operation of the machine, it is driven forwardly by a tractor coupled to it as at 64 and steered from the hand wheel 21, which operates the shaft 20ª, the pinion 22, the gear 23 and the axle 11 for controlling the steerable wheels 65 on the axle 11.

Supported on brackets 66 on the frame member portions 16 are wheels 67.

It should perhaps be noted that the members 16 extend through holes in the apron or scoop member 32, as shown for instance in Figure 1.

The snow slides up the scoop member 32, being broken up and also forced rearwardly by the blades or wings 48 of the beater structure.

Snow slides onto the lower substantially level portion of the endless conveyor, where it rests on the floor or platform 44.

The chains 42 being operated from the shaft 25 drag the snow along and thence up the bottom or platform member 45 to be discharged at the upper, outer end of the conveyor.

The shaft 50 will be thrown out of gear by operating the handle 53 for controlling the clutch 51 for thus rendering the endless conveyor and the beater device inoperative.

It should perhaps be mentioned that at the end of the conveyor opposite the raised portion thereof, the trough 24 has a high wall, as at 69, shown in Figure 3.

The entire machine is comparatively simple of construction and operation.

It may be made in any size desired and can be used for clearing highways rapidly and easily.

Changes may be made in the details of the structure of the machine without departing from the real spirit and purpose of my invention, and it is my intention to cover by my claim, any modified forms of structure or use of mechanical equivalents, which may be reasonably included within its scope.

I claim as my invention:

A snow plow comprising a V shaped frame, supporting wheels mounted on the front diverging portion thereof and steerable supporting wheels mounted on the rear converging portion thereof, a platform and a lateral conveyor mounted on said frame having an upwardly extending portion projecting beyond one of the sides of the frame, an inclined scoop for conveying snow from the ground to the lateral conveyor, a rotating beater comprising blades adapted to engage the snow and slide it up the inclined scoop and onto the conveyor, side wings for deflecting the snow toward said scoop, a motor mounted on said platform and means for operatively connecting said conveyor and beater to said motor.

IRVEN RECKARD.